Jan. 17, 1961 D. E. HULL 2,968,720
METHOD AND APPARATUS FOR LIQUID LEVEL
CONTROL AND INDICATION
Filed Nov. 30, 1954

INVENTOR
DONALD E. HULL
BY
ATTORNEYS

United States Patent Office 2,968,720
Patented Jan. 17, 1961

2,968,720
METHOD AND APPARATUS FOR LIQUID LEVEL CONTROL AND INDICATION

Donald E. Hull, Berkeley, Calif., assignor to The California Research Corporation, San Francisco, Calif., a corporation of Delaware Filed Nov. 30, 1954, Ser. No. 472,079

3 Claims. (Cl. 250—43.5)

This invention relates to liquid level indication, detection, and control methods and equipment, and particularly refers to those involving a source of radioactivity adapted to float within a vessel on a liquid interface, the location of which is to be determined accurately, and includes the steps of selectively shielding a detector of radioactivity positioned outside of the vessel so that an abrupt change of indication will be effected by a small change in liquid level with respect to an edge or boundary of the shielding means.

Heretofore, it has been the practice with liquid level controls using radioactive sources positioned at a liquid-gas or liquid-liquid interface, to place a detector, such as a Geiger counter tube, in a fixed or movable position outside of and immediately adjacent to the wall of the liquid-containing vessel. The radioactive source is guided within the vessel to move vertically therein at a substantially constant spacing from the vessel wall according to variation in the liquid level. An example is illustrated in U.S. Patent 2,456,233 issued December 14, 1948, to A. Wolf.

Such arrangements give a maximum response by the detector when the source is aligned therewith in the same horizontal plane. The variation in response at levels immediately above and below that plane, however, follows in general the inverse square law, which gives only a slight change in amplitude of detector response for a fairly wide variation in liquid level.

This invention comprehends broadly the steps of positioning a shield or absorber between the radioactive source and the detector, the shield extending either upwardly or downwardly from the level at which the liquid is to be maintained. Desirably, but not necessarily, the type of detector is chosen to be that in which the detecting element is asymmetrical or elongated, and this longer axis is placed in the horizontal plane and aligned with the single horizontal edge or boundary of the shielding means. The improved results and advantages have proved to be unexpectedly great, as will be apparent from the preferred arrangement to be described below.

It is an object of this invention to provide an improved liquid level indicating and controlling method which will give a large change of response for a very small change in the level of the liquid, the steps of arranging a shield having a single effective horizontal boundary and a detector of radioactivity to be coplanar at the level to be sensed by said detector.

Another object is to provide a method of sharply distinguishing the position of a vertically movable radioactive source with regard to a given horizontal plane.

Another object is to provide an improved combination of an elongated or asymmetrical radiation detector and a single straight edged shield therefor, to increase the sensitivity of the detector to small changes in the position of a radioactive source.

These and other objects and advantages will be further apparent from the following description and the attached drawing, which forms a part of this specification, and illustrates a preferred and an alternative form of the invention, as applied to a liquid-gas interface controller.

In the drawing, Figure 1 is a vertical sectional detail view of a portion of a vessel having a liquid-gas interface, the level of which is to be controlled with means embodying this invention.

Figure 1:
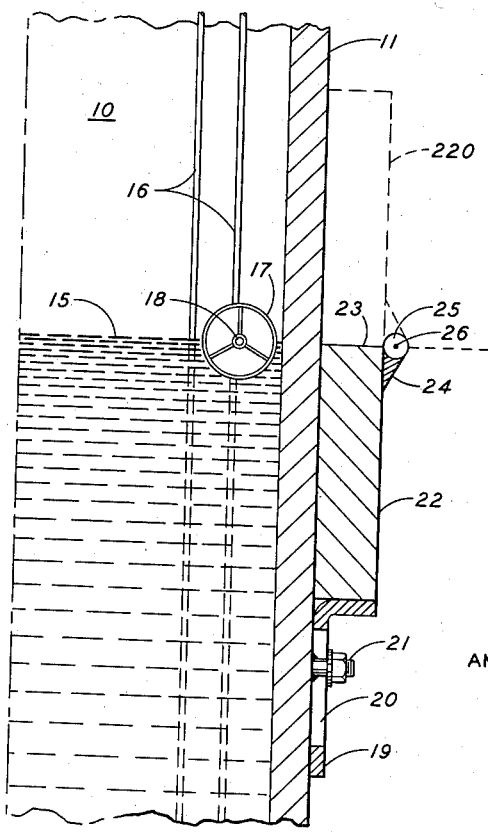

Referring to the drawings, reference numeral 10 designates generally a vessel or tank comprising a steel shell 11, a vapor connection 12, a liquid connection 13, and a second liquid connection 14, the latter leading to liquid supplying or withdrawing means (not shown). It is desired to maintain the gas-liquid interface 15 at the level shown, and to this end, a guide means is provided which may consist of a plurality of vertical rods 16, suitably spaced adjacent to shell 11 and forming a vertical case to retain a float 17 containing a radioactive source 18, such as a few millicuries of cobalt $^{60}$, at a predetermined distance from the shell. In the present instance float 17 is substantially tangential to the interior of shell 11, as shown in Figure 1, so that substantially no liquid is interposed between the radioactive source 18 and the shell.

Outside of vessel 10 and adjustably secured thereto by a bracket 19, which, in this example, is slotted at 20 to receive one or more threaded studs 21 welded to shell 11, is vertically elongated shield or radiation absorber 22, which may be of lead, steel or the like, and of appropriate width. At the upper horizontal edge or boundary 23 of the absorber, in this example, is a bracket 24 which supports a Geiger tube 25, desirably with its central wire 26 in a horizontal position. Any other type of detector of radiation would be suitable to some degree, but there are advantages in using one of asymmetrical elongated configuration, as in this example, for reasons which will be further apparent below.

Figure 2:
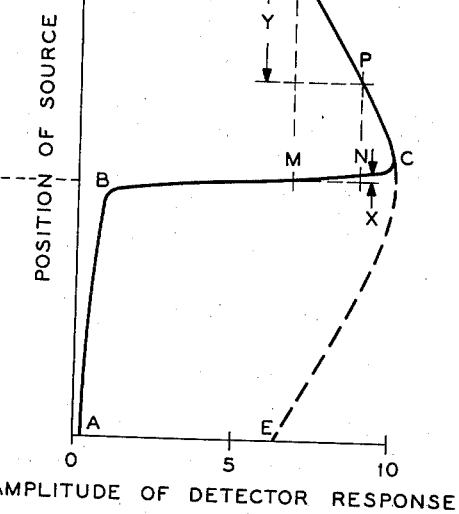
Figure 2 is a graphical representation of the amplitude of response of the shielded radiation detector unit as compared with an unshielded one, illustrating the improved results obtained.

Figure 2, which is aligned for comparison with Figure 1 of the drawing, illustrates graphically the response of detector tube 25 to positions of the floating radioactive source 18 above and below the horizontal plane in which the top edge 23 of shield 22 and the longitudinal axis or central wire 26 of the tube both lie. With the liquid level below the desired point and near the bottom of shield 24, the amplitude of the detector response is indicated by the point A on the curve of Figure 2. As the level and radiation source 18 rise, the response magnitude increases only relatively slowly to point B. When the level rises just above that point so that the detector 25 has an uninterrupted view of the source, except for the constant effect of shell 11, the magnitude of response increases along the line BC, indicating that there is a very large change in useful signal output of detector tube 25. If the level of liquid 15 should continue to rise, the magnitude of the detector response will decrease relatively slowly to follow the general inverse square law curve represented by CD. Curve CF is a projection of CD and illustrates dimensionally the normal inverse square response of an unshielded installation.

Referring now to the usable change of signal strength from detector 25 as shown in Figure 2, the horizontal distance MN illustrates, for example, the voltage or current differential needed to actuate a given control or indicating device, such as an electronic or mechanical relay. This differential is produced by a vertical motion of the floating radioactive source 18 through distance X, representing only a very small change in liquid level along the line BC. If, however, the unshielded arrangement of the prior art liquid level responsive systems was to be used to produce the same output differential, PQ, on line CD, a far greater change in liquid level Y would be required as is apparent from the curve.

Figure 3:
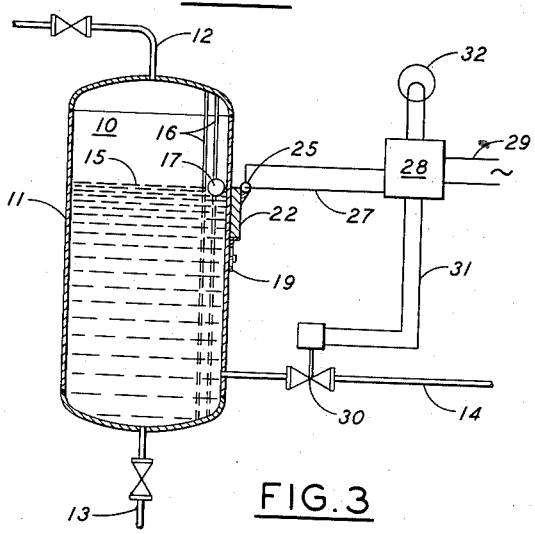
Figure 3 is a vertical sectional view of the vessel of Figure 1 with conduit means for selectively adding to and withdrawing liquid therefrom, and with the improved level control in place thereon.

From the foregoing, it will be appreciated that this large change in signal amplitude which occurs as the liquid level carrying radiactive source 18 passes the edge of shield 22 may be very effectively and simply used for either liquid level indication, recordation or control. In this example (Figure 3) the response of detector 25 is transmitted through circuit 27 to a suitable amplifier 28, energized from power source 29, to control valve 30 through an appropriate circuit 31. Valve 30 may be used selectively to either introduce or withdraw liquid from tank 10, depending on the requirements of the system. If desired, amplifier 28 could operate a signal light or other indicator 32 to show whether the level of liquid 15 is above or below the desired point.

It will also be apparent that a reversal of the position of shield 22 to be above the desired level of the liquid 15 in vessel 10, as indicated by the dotted lines 220, would give a mirror or inverted image of the detector response ABCD of Figure 2, and could equally well be used for the several functions and operations described herein. The necessary reversal or changes of the signal change responsive circuits and outputs of amplifier 28 would be well within the knowledge of one skilled in electronics and hence does not need description herein.

Although specific arrangements of means for practicing the method of this invention are shown and described, it is obvious that numerous changes could be made without departing from its essential features, and all such modifications that fall within the scope of the appended claims are intended to be embraced thereby.

I claim:
1. The method of controlling the level of a liquid interface in a container, which comprises the steps of floating a source of penetrative radiation at said interface, confining the vertical path of said source with respect to the wall of said container to be closely adjacent thereto, fixing a downwardly extending vertically elongated radiation absorber outside of and adjacent to the wall of said container with a single horizontal boundary at its upper edge, said boundary coinciding with only one side of the level desired to be maintained, aligning a fixed detector for radiation with said boundary, said detector being responsive to radiation from said source when said interface is at or above the level of said boundary, and selectively controlling the admission to and withdrawal of liquid from said container in accordance with the response of said detector.

2. The method of increasing the response of a fixed detector of radiation to an upward or a downward departure in the position of a vertically moving radiation source from a given horizontal plane defining a desired level of liquid in a vessel, comprising the steps of aligning a horizontal boundary of a fixed absorber for radiation with said detector to be coplanar therewith and extending only downwardly therefrom and moving said radiation source through a vertical path extending above and below said plane in accordance with variations in liquid level therein, the path of radiation from said source to said detector being substantially unobstructed by said liquid.

3. In a liquid level responsive system, the combination comprising a vertically moving source of radioactivity, a downwardly extending shield for radioactivity having a single effective horizontal boundary at its upper edge, a detector of radioactivity positioned to be coplanar with said boundary and on the opposite side of said shield from said source, there being substantially no liquid between said shield and said source at all positions of the latter, and means responsive to the change in output of said detector due to both upward and downward movement of said source with respect to the shielded and unshielded sides of said boundary.

References Cited in the file of this patent
UNITED STATES PATENTS

| | | |
|---|---|---|
| 2,323,128 | Hare | June 29, 1943 |
| 2,456,233 | Wolf | Dec. 14, 1948 |
| 2,486,845 | Herzog | Nov. 1, 1949 |
| 2,708,721 | Ziffer | May 17, 1955 |

FOREIGN PATENTS

| | | |
|---|---|---|
| 703,712 | Great Britain | Feb. 10, 1954 |